(12) United States Patent
Stamenkovic

(10) Patent No.: US 8,770,051 B2
(45) Date of Patent: Jul. 8, 2014

(54) APPARATUS AND METHOD FOR MEASURING BORES

(75) Inventor: Milan Stamenkovic, Stuttgart (DE)

(73) Assignee: Stotz Feinmesstechnik GmbH (DE)

( * ) Notice: Subject to any disclaimer, the term of this patent is extended or adjusted under 35 U.S.C. 154(b) by 458 days.

(21) Appl. No.: 13/085,583

(22) Filed: Apr. 13, 2011

(65) Prior Publication Data

US 2011/0247409 A1 Oct. 13, 2011

(30) Foreign Application Priority Data

Apr. 13, 2010 (DE) .......................... 10 2010 014 817
Dec. 27, 2010 (EP) ..................................... 10016110

(51) Int. Cl.
*G01D 21/00* (2006.01)
*G01B 3/00* (2006.01)
*G01B 1/00* (2006.01)

(52) U.S. Cl.
USPC .............. 73/866.5; 33/543; 33/544; 33/544.1

(58) Field of Classification Search
USPC ............ 73/37.5, 865.8, 866.5; 33/543, 544.1, 33/544, 550
See application file for complete search history.

(56) References Cited

U.S. PATENT DOCUMENTS

| 4,306,455 | A | * | 12/1981 | Selleri | .......................... 73/865.8 |
| 5,117,081 | A | * | 5/1992 | Bagdal | ........................ 219/69.11 |
| 5,465,221 | A | * | 11/1995 | Merat et al. | ..................... 702/83 |
| 2007/0153296 | A1 | * | 7/2007 | Schick | ........................... 356/609 |
| 2007/0240324 | A1 | * | 10/2007 | Weier | .............................. 33/701 |

* cited by examiner

*Primary Examiner* — Daniel S Larkin
*Assistant Examiner* — Jamar Ray
(74) *Attorney, Agent, or Firm* — Cantor Colburn LLP

(57) ABSTRACT

An apparatus for the industrial measurement of bores in a measurement object is provided. The apparatus includes a measurement probe which can be introduced into the bore and at which at least one distance sensor is provided with which the instantaneous distance of a reference point of the measurement probe from a wall of the bore can be determined. The measurement probe is rotatably supported at a holder which is fixed with respect to the measurement object and/or whose position relative to the measurement object is known. An evaluation device receives a number of sequentially determined distances in the course of a rotation of the measurement probe.

20 Claims, 7 Drawing Sheets

APPARATUS AND METHOD FOR MEASURING BORES

CROSS-REFERENCES TO RELATED APPLICATIONS

This patent application claims the benefit of priority to German Patent Application Ser. No. 102010014817.2, filed Apr. 13, 2010, and claims the benefit of priority to European Patent Application Ser. No. 10016110.8, filed Dec. 27, 2010, each of which are incorporated herein by reference in their entirety.

FIELD OF THE INVENTION

The present invention relates to an apparatus for the industrial measurement of bores in a measurement object. A measurement probe can be introduced into the bore of a workpiece and at which at least one distance sensor is provided with which the instantaneous distance of a reference point of the measurement probe from a wall of the bore can be determined. The term "bore", as used in this specification, is defined broadly to include other cut-outs introduced into a workpiece such as milled grooves, notches and the like.

BACKGROUND OF THE INVENTION

In many areas of industrial metrology, it is necessary to check bores in workpieces with respect to their shape accuracy. It is in particular necessary to determine deviations from a predefined shape, in addition to a circular shape or an ellipse, a star shape or a freeform shape, to mark the respective workpiece as unusable as required. The shape accuracy of bores can in principle be determined by means of shape measurement devices and/or 3D coordinate measurement machines in a laboratory-like measurement room. Such shape determinations are, however, relatively time-consuming and very expensive due to the high purchasing costs for the measurement devices. In addition, the corresponding measurements can easily be influenced by changing environmental conditions such as temperature, contaminants, vibrations and the like. For these reasons, a complete inspection, in which all workpieces produced are checked, can hardly be carried out in the named manner.

If the roundness in a circular bore should be checked, in practice the "ovalness" of a bore is frequently determined instead of the roundness as an approximated value for the roundness deviation. The ovalness can be determined via a diameter determination. If the shape error is distributed symmetrically along the bore circumference, the ovalness generally sufficiently corresponds to the roundness deviation. If, however, an asymmetrical circular deformation is present, there are considerable deviations between the ovalness and the roundness deviation. This can have the result that under certain relationships of the diameter tolerance and roundness tolerance the ovalness is not a suitable test criterion for the division of the workpieces into the categories "usable" and "non-usable". Quality control may have to be supplemented by supporting roundness measurements carried out in the measurement room, which is in turn associated with a high time effort and unwanted costs. Since the roundness determined via the ovalness is smaller in many practical cases than the directly determined roundness, there is in particular the problem that workpieces which are unusable due to inadmissibly large shape errors are classified as usable, which generally should be avoided.

SUMMARY OF THE INVENTION

Accordingly, it is desirable to provide a method and apparatus to measure bores fast and reliably and in particular to check the shape and the tolerance of bores in an industrial environment.

In accordance with an exemplary embodiment of the invention, an apparatus for the industrial measurement of bores in a measurement object, in particular a workpiece is provided. The apparatus has a measurement probe which can be introduced into the bore and at which at least one distance sensor is provided with which the instantaneous distance of a reference point of the measurement probe from a wall of the bore can be determined. In accordance with an embodiment of the invention, the measurement probe is rotatably supported at a holder which is fixed with respect to the measurement object and/or whose position relative to the measurement object is known. An evaluation device receives a number of sequentially determined distances in the course of a rotation of the measurement probe.

In an exemplary embodiment, and unlike known systems, the invention does not determine the diameter of the bore to be measured which is determined, but rather the distance between the measurement probe and the wall of the bore, whereby a particularly precise and/or exact measurement is possible. Not only an individual parameter, but also the precise shape of the bore can be determined by an association between the instantaneous position and rotary position of the measurement probe relative to the measurement object and the respective distance measured by the distance sensor. To obtain the precise or exact measured values, the holder is in one embodiment, fixed with respect to the measurement object. In addition or alternatively, the relative position of the holder with respect to the measurement object can be determined and taken into account in the evaluation.

In accordance with another embodiment, the evaluation device determines a maximum inscribed circle and a minimum circumscribed circle of the measured bore from the sequentially determined distances.

In yet another exemplary embodiment, the roundness of the bore is given by the size difference between the maximum inscribed circle and the minimum circumscribed circle. Those concentric circles are called a maximum inscribed circle and a minimum circumscribed circle between which all wall coordinates of the bore lie which are determined as a radium with respect to a common center, with the smaller circle being the maximum inscribed circle and the larger circle being the minimum circumscribed circle. To calculate the circles using determined distance values between a reference point of the measurement probe and the wall of the bore, algorithms known in the technical field can be used such as LSC (least squares circle), MCC (minimum circumscribed circle), MIC (maximum inscribed circle), and MZC (minimum zone circle).

In still yet another exemplary embodiment, a measurement of bores with high accuracy is made possible by the determination of the maximum inscribed circle and of the minimum circumscribed circle since, while the difference between the minimum diameter and the maximum diameter can also be relatively small with extremely non-round bores, the difference between the maximum inscribed circle and the minimum circumscribed circle correlates substantially better with the real roundness deviation of the bore. A better evaluation of the actual roundness of a bore thus results in comparison with conventional systems by the determination of the maximum inscribed circle and of the minimum circumscribed circle from the measured distances between the measurement probe and the wall of the bore. Furthermore, the diameter of the bore can also be reliably determined in the described manner.

In accordance with a still further embodiment, the evaluation device determines the shape extent of the bore at least sectionally from the sequentially determined distances. In particular, bores which have a defined desired roundness deviation can also be checked by the determination of the shape extent—that is the spatial extent of the wall of the bore. When a workpiece is pressed into a bore, a deformation can namely occur which, in the case of exactly cylindrically produced bores, results in a roundness deviation after the installation. This problem can be eliminated in that the bore is directly provided with a shape which deviates from the exact roundness and which is particularly opposed to the expected deformation. Slightly oval or star-shaped bores can be considered, for example. In one embodiment, even such bores can be reliably measured by a determination of the complete shape extent. A preset shape extent can be defined by a constant function having an upper and a lower tolerance limit. The determined actual shape extent can in particular be checked as to whether it lies within the tolerance limits. On the determination of the shape extent, the sampling rate, that is the number of the distances determined per angle of rotation unit, is adapted to the defined shape extent. Complex shapes generally require a higher sampling rate.

In still yet another exemplary embodiment, a drive is preferably provided for rotating the measurement probe with respect to the holder to allow a largely automated measurement process.

In accordance with yet still another embodiment of the invention, a rotational position sensor is provided for determining the instantaneous rotational position of the measurement probe relative to the holder, with the evaluation unit being designed to put respective distances determined by the distance sensor in the course of a rotation of the measurement probe in relation with the associated rotational positions determined by the rotational position sensor. In this manner, not only a minimum distance and a maximum distance can be determined from all measured distances, but the wall extent or shape extent of the bore, that is e.g. their cross-sectional shape in a specific plane, can also be determined. Every individual distance can in particular also be checked as to whether it lies between a defined minimum value and a maximum value.

In still another exemplary embodiment, apparatus means are provided for determining the position and/or the inclination of the measurement probe relative to the holder and/or to the measurement object. Measurement errors can hereby be compensated which may result on a different arrangement of the longitudinal center axis of the measurement probe and the axis of rotation. Any wobble movement of the measurement probe during the rotation or a lateral displacement or tilt of the holder can in particular be detected and taken into account in the evaluation of the measured data.

In another embodiment, at least one distance sensor can be provided at the holder as a means for determining the position and/or inclination of the measurement probe and the instantaneous distance of a reference points of the holder from the measurement probe can be determined by it. A position change and/or inclination change of the measurement probe relative to the holder and thus—with a fixed or at least known position of the holder with respect to the workpiece—to the workpiece can easily be determined by such a distance sensor.

In accordance with yet another embodiment, at least one pair of two distance sensors is provided at the holder for determining the instantaneous distance of a reference point of the holder from the measurement probe, the pair being arranged in a common plane and offset to one another by an angle of rotation, in one embodiment that angle being 90°, with respect to an axis of rotation of the measurement probe. The two-dimensional position of the measurement probe in the respective plane can be determined by a pair of rotationally offset distance sensors.

In accordance with still a further embodiment, at least two pairs of distance sensors are provided for determining the instantaneous distance of a reference point of the holder from the measurement probe, the pairs spaced apart from one another in the direction of the axis of rotation. In this manner, the two-dimensional position of the measurement probe can be measured in a plurality of planes along the axis of rotation. The spatial inclination of the measurement probe relative to the holder can e.g. be determined by a measurement in two parallel planes. To increase the accuracy and reliability of the measurement further, a respective plurality of pairs of distance sensors can also be arranged in a common plane.

One or more sensors, in still yet another embodiment, in particular distance sensors, are provided to detect the instantaneous position of the holder relative to the workpiece. For example, pneumatic measurement nozzles can be provided at a side of the holder facing the workpiece. In this manner, an inclined workpiece surface, and thus a measurement probe tilted with respect to a surface normal, can e.g. be compensated by calculation.

In accordance with yet a further embodiment, the measurement probe can be dome-like and in particular sectionally cylindrical, with a longitudinal center axis of the measurement probe coinciding with an axis of rotation. The holder is then in one alternate embodiment, fixed to the workpiece such that the longitudinal center axis of the measurement probe coincides as exactly as possible with the longitudinal center axis of the bore. The dome-like measurement probe can be displaced along the axis of rotation in the bore in order thus to measure the shape of the bore in different penetration depths.

In accordance with a further embodiment, a plurality of distance sensors are provided at the measurement probe to determine the instantaneous distance of a reference point of the holder from the measurement probe which are spaced apart in the direction of an axis of rotation of the measurement probe and which are rotationally displaced from one another with respect to the axis of rotation. The bore can thus be measured in a plurality of planes simultaneously. The distance sensors can in this respect be arranged at the measurement probe offset relative to one another by an angle of rotation. Such an offset must be taken into account in the evaluation of the measured data.

In one embodiment, at least one of the distance sensors can be based on an inductive or a capacitive measurement principle. For example, inductive sensors in the form of linear variable differential transformers (LVDTs) can be used with or without pneumatic lift.

Furthermore, in another alternative embodiment at least one of the distance sensors can be formed as a pneumatic measurement nozzle. In accordance with yet another embodiment of the invention, all the provided distance sensors are formed as pneumatic measurement nozzles.

In yet still another embodiment, a contact surface for pressing the apparatus onto a surface of the measurement object is provided at the holder. A planar end face of a ring-shaped holder can in particular serve as a contact surface. Relative movements between the holder and the workpiece can be reliably avoided by an areal fixing of the holder to the workpiece.

Another embodiment includes at least one receiver for an engagement with a wall section of the measurement object that is provided at the holder, with in particular elastic elements being provided in the receiver for fixing the wall section in the receiver. The fixing of the holder can be improved by such a receiver, in particular with workpieces having insufficient contact surfaces.

In accordance with another further embodiment, the measurement probe is adjustable, in particular by means of a driven linear slide, in the direction of the axis of rotation relative to the holder. A measurement of the bore in different depths can thus take place particularly fast and reliably.

The invention, in still another embodiment, also relates to a method of measuring bores in a measurement object, in particular a workpiece, by means of a measurement probe. The measurement probe is introduced into the bore and at which at least one distance sensor is provided with which the instantaneous distance of a reference point of the measurement probe from a wall of the bore can be determined.

In accordance with another exemplary embodiment of the invention, the measurement probe is introduced into the bore and is rotated about an axis of rotation in the bore, with the instantaneous distances being determined repeatedly or continuously during the rotation.

In accordance with yet still another embodiment, the maximum inscribed circle and the maximum inscribed circle of the bore are determined. This is done using an algorithm known in the technical field. The difference of the radius values for the maximum inscribed circle and the minimum circumscribed circle can be used as an important quality parameter of the bore. Roundness deviations can be determined substantially more precisely and reliably by such a radius-related measurement of the bore than by a customary diameter-related measurement.

In an exemplary embodiment, the measurement probe is rotated by at least one full revolution during a measurement procedure. It is thereby precluded that limited local shape deviations remain out of consideration in the measurement.

In a particular exemplary embodiment, the roundness of the bore can be determined from the deviation between the maximum inscribed circle and the minimum circumscribed circle. The roundness is an important measure for the production quality of bores.

In accordance with still another further embodiment, the shape extent of the bore is determined at least sectionally from the distances determined during the rotation. In this manner, in particular workpieces can also be checked which have a bore with a defined shape extent, e.g. a shape extent corresponding to an elliptical, star-shaped or freeform shape.

In still a further exemplary embodiment, a position change and/or an inclination change of the measurement probe relative to the measurement object occurring during the rotation is detected and taken into account in the further evaluation. Wobble movements of the measurement probe or an error position of the measurement probe—e.g. a tilt of the measurement probe due to an inclined surface of the measurement object—can thus be taken into account and their influence on the measured result compensated.

These and other advantages and features will become more apparent from the following description taken in conjunction with the drawings.

BRIEF DESCRIPTION OF THE DRAWINGS

The invention will be described in the following by way of example with reference to the drawings.

DETAILED DESCRIPTION

Figure 1:
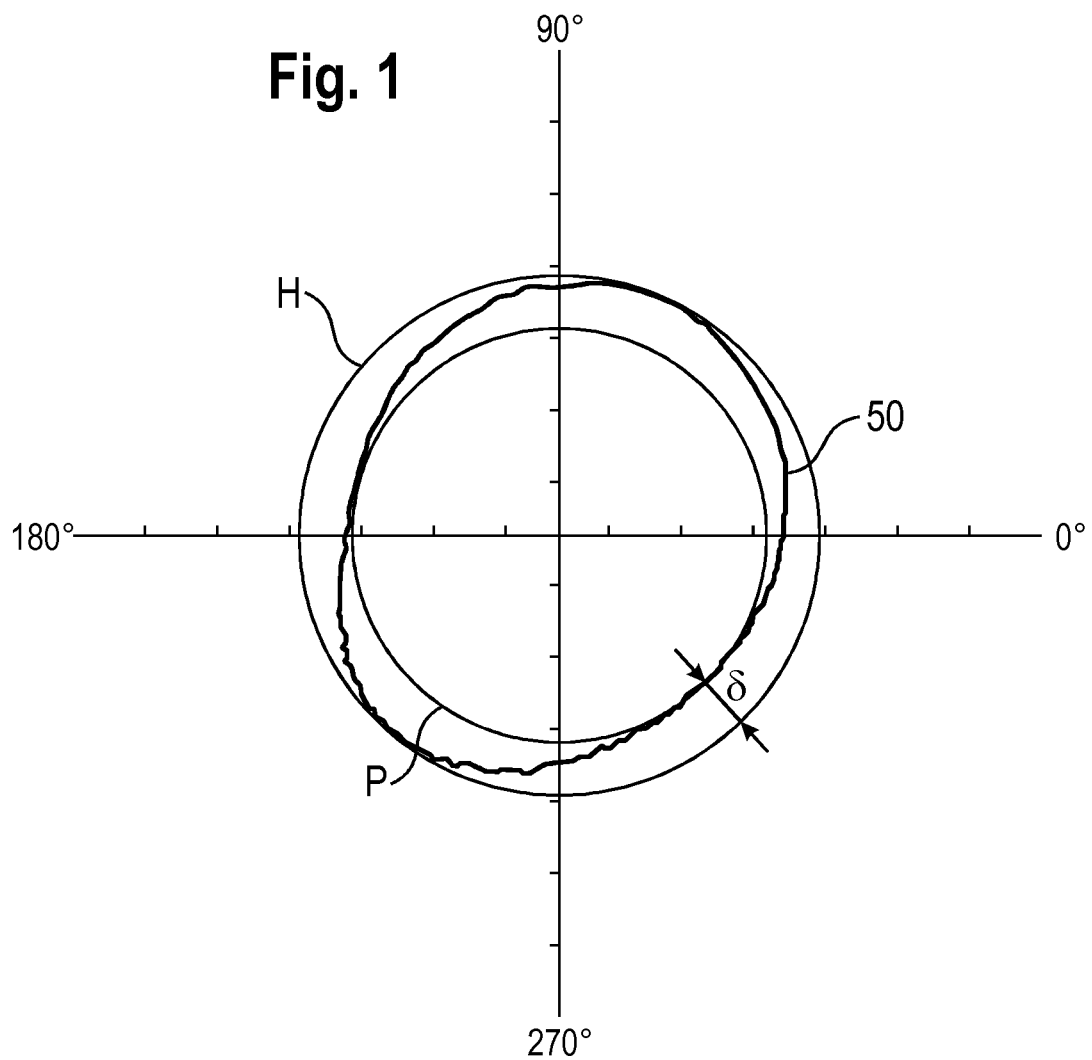
FIG. 1 illustrates the roundness determination of a bore by means of a maximum inscribed circle and a minimum circumscribed circle.

Referring now to the Figures, where the invention will be described with reference to specific embodiments without limiting same, the roundness determination by means of a minimum circumscribed circle H and a maximum inscribed circle P concentric thereto is shown with reference to a plan view of a bore 50 in a two-dimensional coordinate system in FIG. 1. The radius of the bore 50 shown extremely oval for illustration with respect to the center of the coordinate system varies along the wall extent of the bore 50 between the radius of the maximum inscribed circle P and the radius of the minimum circumscribed circle H. The poorer the roundness of the bore 50, the more the radii of the minimum circumscribed circle H and of the maximum inscribed circle P. The difference $\delta$ between the radius of the minimum circumscribed circle H and the radius of the maximum inscribed circle P is thus a measure for the deviation of the shape of the bore 50 from the exact roundness. To determine the minimum circumscribed circle H and the maximum inscribed circle P, the radius values of the bore 50 with respect to a common center have to be determined along the total wall extent of the bore 50, which is associated with a high effort.

Figure 2:
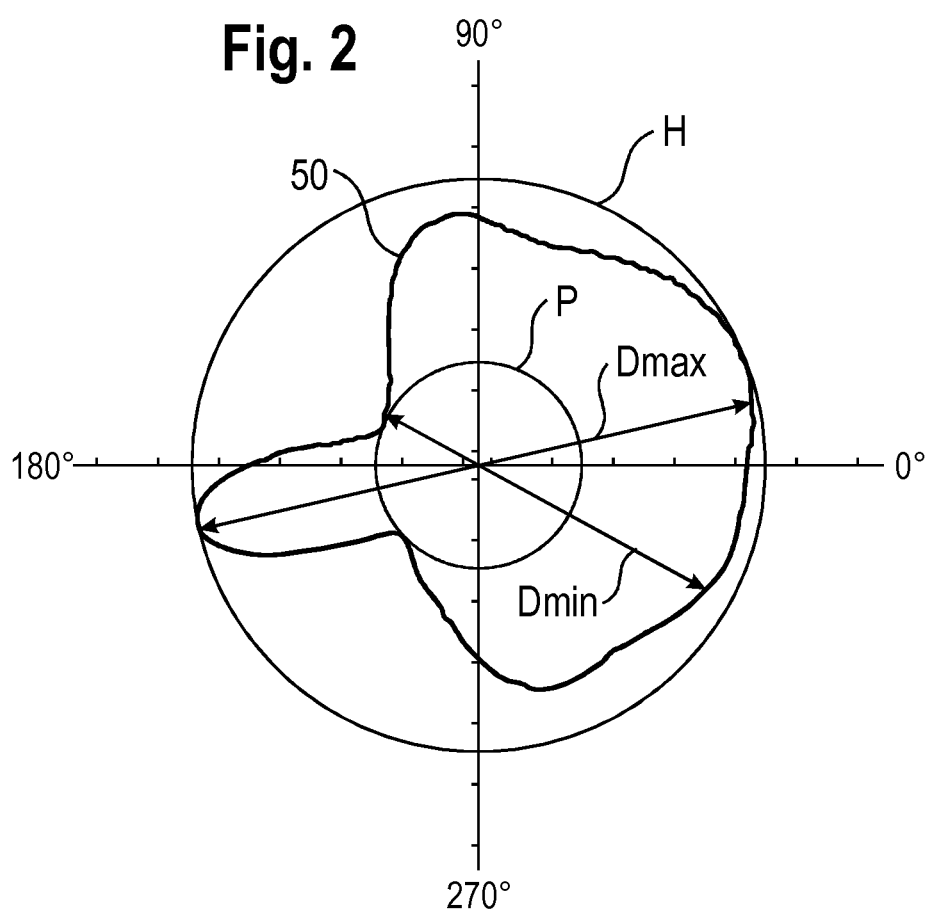
FIG. 2 illustrates the determination of the ovalness of a bore by means of a minimum diameter and a maximum diameter.

In practice, a procedure in accordance with FIG. 2 is therefore frequently followed, i.e. the quality of the roundness of the bore 50 is determined with reference to its minimum diameter Dmin and its maximum diameter Dmax. Specifically, the largest diameter Dmax and the smallest diameter dmin of the bore can be determined and the ovalness can be determined using the following rule of thumb:

$$\text{Ovalness}=(D\text{max}-D\text{min})/2.$$

This process can, however deliver unwanted results depending on the type of roundness deviation. It can specifically occur that a bore 50 with an asymmetrical wall extent has a relatively small difference between the minimum diameter Dmin and the maximum diameter Dmax, although it is relatively greatly non-round. This can have the result in a measurement to be carried out within the framework of a quality control that workpieces having insufficiently round bores pass the inspection and are shipped, which generally has to be avoided at all costs.

Figure 3:
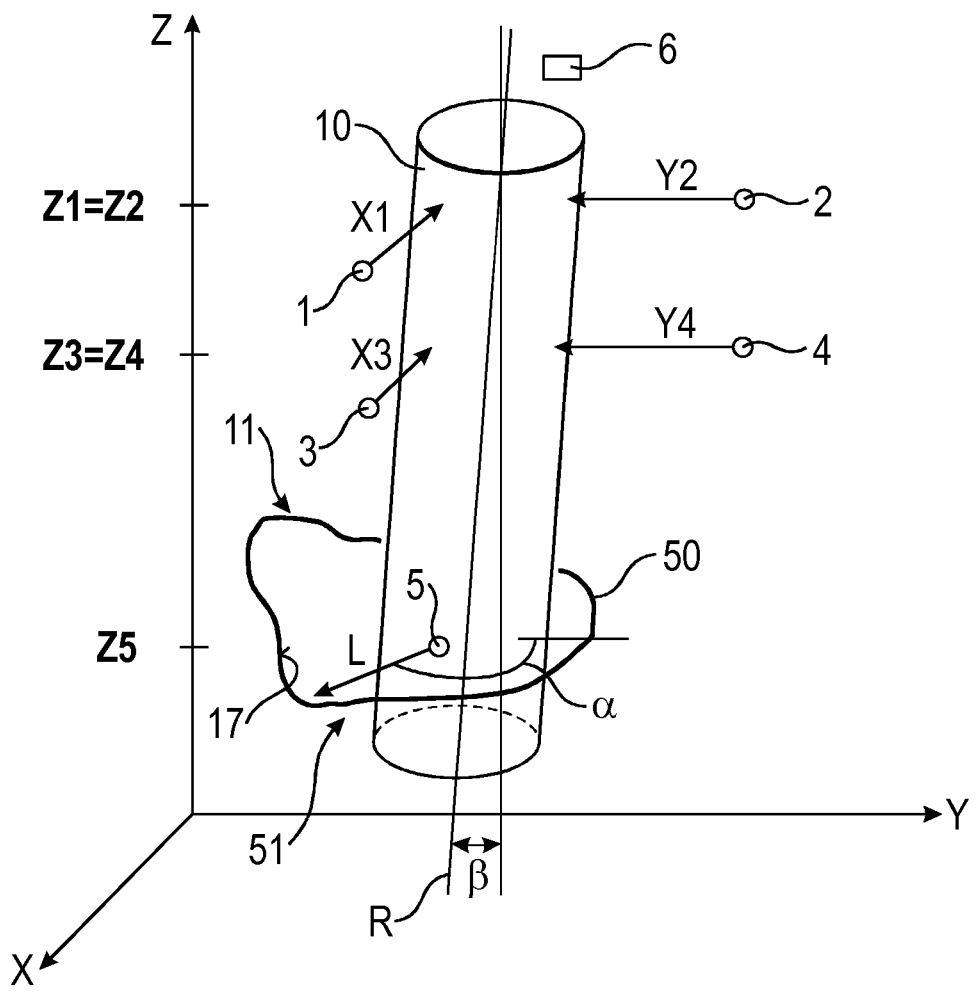
FIG. 3 illustrates the basic principle of a measurement process in accordance with an embodiment of the invention.

In accordance with the invention, a procedure in accordance with the principle shown in FIG. 3 is followed. A distance sensor 5 at the measurement probe side is attached to a bar-shaped cylindrical measurement probe 10 which is supported at a holder to be described in more detail below (FIG. 6). The measurement probe 10 is rotatable about an axis of rotation R which is vertical here and which coincides with the longitudinal center axis of the cylindrical measurement probe 10. In the three-dimensional coordinate system XYZ in accordance with FIGS. 3-5, the axis of rotation R is substantially aligned in the Z direction. The distance sensor 5 at the measurement probe side is designed to detect the instantaneous distance between the measurement probe 10 and a wall 17 of the workpiece 11 to be measured in the radial direction with respect to the axis of rotation R. The distance sensor 5 is fixedly connected to the measurement probe 10. The instantaneous angle of rotation a of the measurement probe 10 with respect to the axis of rotation R is therefore determined by the position of the distance sensor 5. The instantaneous angle of rotation a can be determined by means of an angle of rotation sensor 6.

Furthermore, four distance sensors 1, 2, 3, 4 at the holder side are provided by means of which the current position and/or the current inclination of the measurement probe 10 can be determined relative to the workpiece 11. For this purpose, the distance sensors 1, 2, 3, 4 are fixedly connected to the holder 12 which can be fixed relative to the workpiece 11. With a fixed holder 12, the distance sensors 1, 2, 3, 4 are therefore unmovable with respect to the workpiece 11, whereas the measurement probe 10 is movable relative to the holder 12.

A respective two of the distance sensors 1, 2, 3, 4 at the holder side are arranged in a common plane and are offset to one another by an angle of rotation 90°. The height Z1 of the first distance sensor 1 at the holder side is therefore equal to the height Z2 of the second distance sensor 2 at the holder side (Z1=Z2) and the height Z3 of the third distance sensor 3 at the holder side is equal to the height Z4 of the fourth distance sensor 4 at the holder side (Z3=Z4). The distance sensor 5 at the measurement probe side is arranged at a height Z3 different from Z1 and Z2 close to the front end 51 of the measurement probe 50.

As can be seen from FIG. 3, the first and the third distance sensors 1, 3 at the holder side detect the distance from the measurement probe 10 in the X direction, whereas the second and the fourth distance sensors 2, 4 detect the distance from the measurement probe 10 in the Y direction. In this manner, the position and the inclination of the measurement probe 10 in the coordinate system XYZ can be determined. The inclination of the measurement probe can be given e.g. by the angular difference β between the axis of rotation R of the measurement probe 10 and the Z axis of the coordinate system XYZ.

To carry out a measurement, the measurement probe 10 is rotated completely once, i.e. by 360°, about the axis of rotation R, with the distance sensor 5 at the measurement probe side detecting the distances L between the measurement probe 10 and the inner wall 17 of the bore 50 continuously or in repeated single steps during the rotation and the angle of rotation sensor 6 detects the respective associated rotational positions a of the measurement probe 10. The reference point at the measurement probe side for the distance L can in this respect lie on the surface of the measurement probe 10, on a front or inner measurement surface of the distance sensor 5 at the measurement probe side or at any desired other point stationary in space relative to the measurement probe 10.

Provided the position and the inclination of the measurement probe 10 in the coordinate system XYZ does not change during the rotation, the minimum circumscribed circle H and the maximum inscribed circle P, and thus the roundness of the bore 50, can be determined directly on the basis of the distance values L determined by the distance sensor 5 and the angle of rotation values a associated with them determined by the angle of rotation sensor 6.

If, however, the position and/or the inclination of the measurement probe 10 relative to the holder 12 in the coordinate system XYZ changes during the rotation, a falsification of the determined distance values L occurs and consequently a falsified value for the roundness of the bore 50.

For this reason, an evaluation device 23 is provided to correct the distance values L determined by the distance sensor 5 and thus to increase the accuracy and reliability of the roundness determination. Specifically, the currently determined distance value $L(\alpha)$ is replaced by $L'(\alpha)$:

$$L'(\alpha)=L(\alpha)+\text{correction}(\alpha,S1,S2,S3,S4,Z1,Z3,Z5)$$

where S1, S2, S3 and S4 are the distance values determined by the distance sensors 1, 2, 3 and 4. The corrected values $L'(\alpha)$ are determined for the angular range from $\alpha=0°$ to $\alpha=360°$ and are used for the roundness calculation while using an algorithm known in the technical field.

Figure 4:
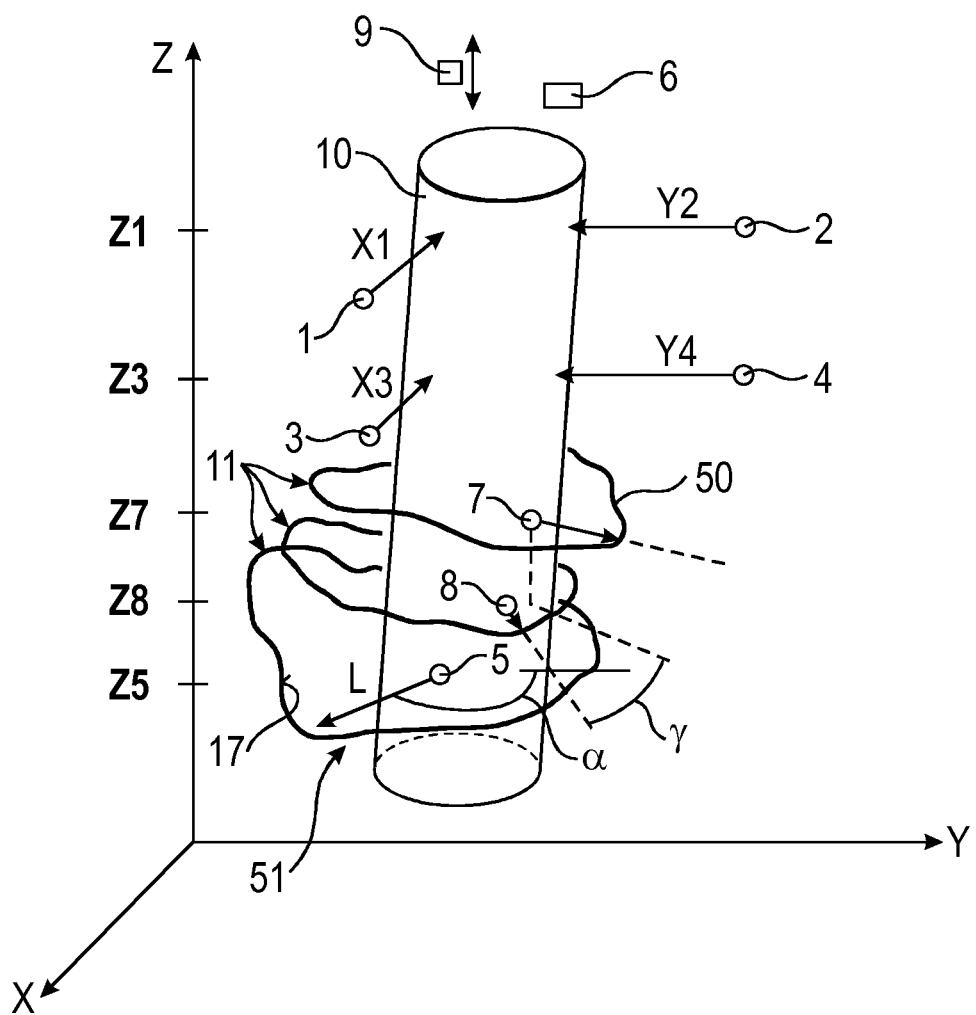
FIG. 4 illustrates the basic principle of a measurement process in accordance with another embodiment of the invention.

In FIG. 4, a variant of the invention is shown in which the measurement probe 10 is displaceable in the Z direction relative to the holder 12 by means of a motorized linear slide 9. The measurement probe 10 can be positioned at any desired height Z relative to the workpiece 11 by means of the linear slide 9, i.e. in any depth of the bore 50, in order thus to measure the bore 50 in three dimensions.

Furthermore, in the variant in accordance with FIG. 4, in addition to the distance sensor 5 at the measurement probe side, two further distance sensors 7, 8 at the measurement probe side are attached to the measurement probe 10. The arrangement of three distance sensors 5, 7, 8 attached at difference heights allows a simultaneous measurement of the bore 50 at three different heights Z5, Z7, Z8. Depending on the arrangement, even more distance sensors can be provided at the measurement probe 10.

The distance sensors 5, 7, 8 are each arranged at the measurement probe 10 rotationally offset from one another by an angle of rotation γ. The respective angle offset γ has to be taken into account in the evaluation.

$$L'_i(\alpha)=L_i(\alpha)+\text{correction}(\alpha,S1,S2,S3,S4,Z1,Z3,Z_i,\gamma_i)$$

where i stands for the index of the respective distance sensor 5, 7, 8.

By a superimposition of a plurality of roundness shapes as well as by an evaluation of surface lines, the cylinder shape and the straightness of the bore 50 can also be determined in addition to the roundness. Furthermore—optionally after a calibration with suitable setting gages—a diameter determination can take place.

The specific embodiment of the measurement probe 10 can be adapted to the workpiece 11 and to the respective distance and angle of rotation sensors 1-8. For practical reasons, the measurement probe 10 can be composed of cylindrical sections of different diameters like the embodiment shown in a side view in FIG. 5.

A typical design of a measurement apparatus in accordance with the invention is shown in a sectional view in FIG. 6. The apparatus includes a ring-shaped holder 12 as well as a measurement probe 10 rotatably supported in the holder 12. The measurement probe 10 can be rotated relative to the holder 12 by means of a drive. A toothed-belt drive having a motor 16 and a drive plate 22 can be used as the drive which is connected to the measurement probe 10 and which is in particular made in one piece therewith. The angle of rotation sensor 6 is arranged opposite the plate 22.

The measurement probe 10 is formed as a pneumatic measurement mandrel, with both the distance sensors 5, 7, 8 at the measurement probe side and the distance sensors 1, 2, 3, 4 at the holder side being pneumatic measurement nozzles. The pneumatic measurement mandrel shown in FIG. 6 is able to simultaneously determine the roundness of the bore 50 in 3 different measurement planes. Generally, the number of measurement planes is only limited by the geometry of the measurement probe 10 and of the workpiece 11. The pneumatic measurement nozzles 1, 2, 3, 4, 5, 7, 8 are supplied with compressed air individually through channels 13, 14. Each measurement nozzle 1, 2, 3, 4, 5, 7, 8 is connected to a pneumo-electric converter, not shown, which outputs a signal in dependence on the air pressure of the respective measurement nozzle, said signal giving the distance of the measurement nozzle from an opposite wall.

The holder 12 has a planar end-face contact surface 52 and is pressed toward the surface of the workpiece 11 by a force 15 such that the measurement probe 10 projects into the bore 50. The holder 12 is fixed immovably to the workpiece 11 by the pressing on.

To carry out a measurement, the measurement probe 10 is rotated by at least one full revolution by means of the motor 16 and the distance L between the inner wall 17 of the workpiece 11 and the measurement probe 10 is measured by means of the measurement nozzles 5, 7, 8 at the measurement probe side. Around 100 distances L can, for example, be measured during a full revolution. The measured distances L are, as described above, corrected using the position values and/or inclination values determined by the measurement nozzles 1, 2, 3, 4 at the holder side and the angle of rotation sensors 6 and are used as L' for a calculation of roundness, diameter, shape extent, straightness and cylinder shape. To determine the cylinder shape and the straightness of the bore 50, at least 3 measurement planes are used. For the roundness determination, the maximum inscribed circle P and the minimum circumscribed circle H of the bore 50 are determined from the corrected distances L' by means of known algorithms such as LSC, MCC, MIC and MZC.

Figure 7:
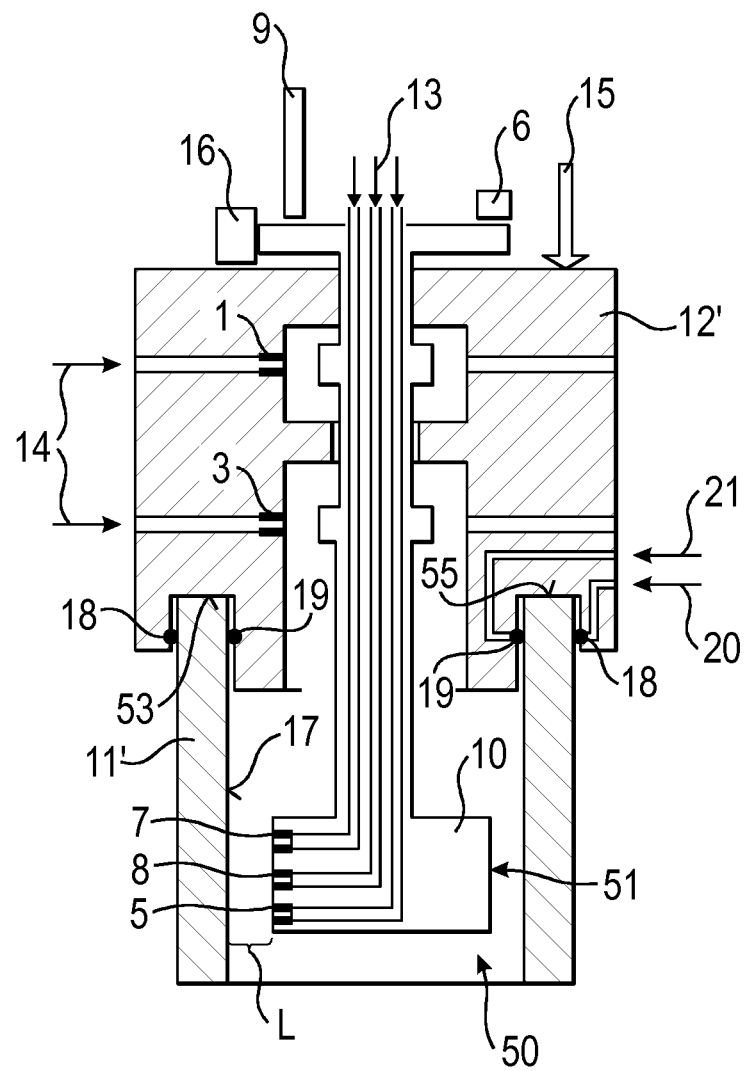
FIG. 7 shows the measurement probe in accordance with FIG. 5 in an alternatively designed holder at which a receiver for an engagement with a wall section of a measurement object is provided.

An embodiment of the measurement apparatus in accordance with the invention is shown in FIG. 7 which is in particular suitable for applications with limited construction space or for thin-walled workpieces 11'. The holder 12' has an end-face cut-out 53 which is made as a receiver for an engagement with the upper margin 55 of the workpiece 11'. There is, therefore, a mechanical guide between the holder 12' and the workpiece 11'. O rings 18, 19 are provided at the inner wall of the cut-out 53 which further improve the mechanical fixing of the holder 12' to the workpiece 11'. This can, in particular, be useful in those applications in which the measurement apparatus is installed into a machine which generates strong vibrations. Furthermore, channels 20, 21 are provided to act on the O rings 18, 19 with compressed air. The holder 12' can thereby be tensioned with respect to the workpiece 11'. Radial vibrations of the workpiece 11' can thereby be compensated particularly easily.

Figure 5:
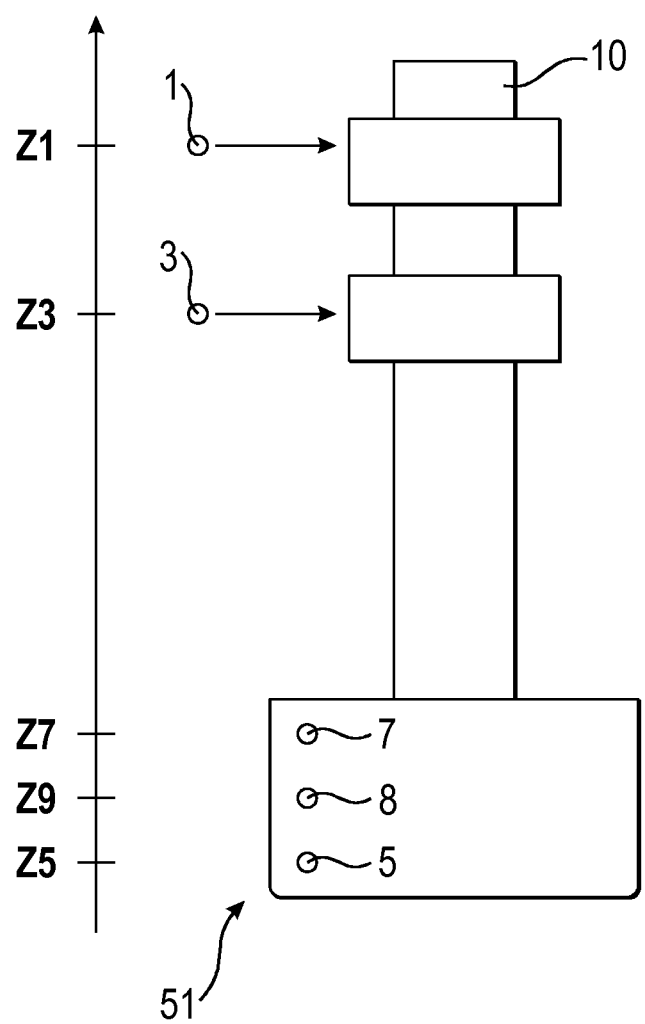
FIG. 5 shows a measurement probe of a measurement apparatus in accordance with the invention.
Figure 6:
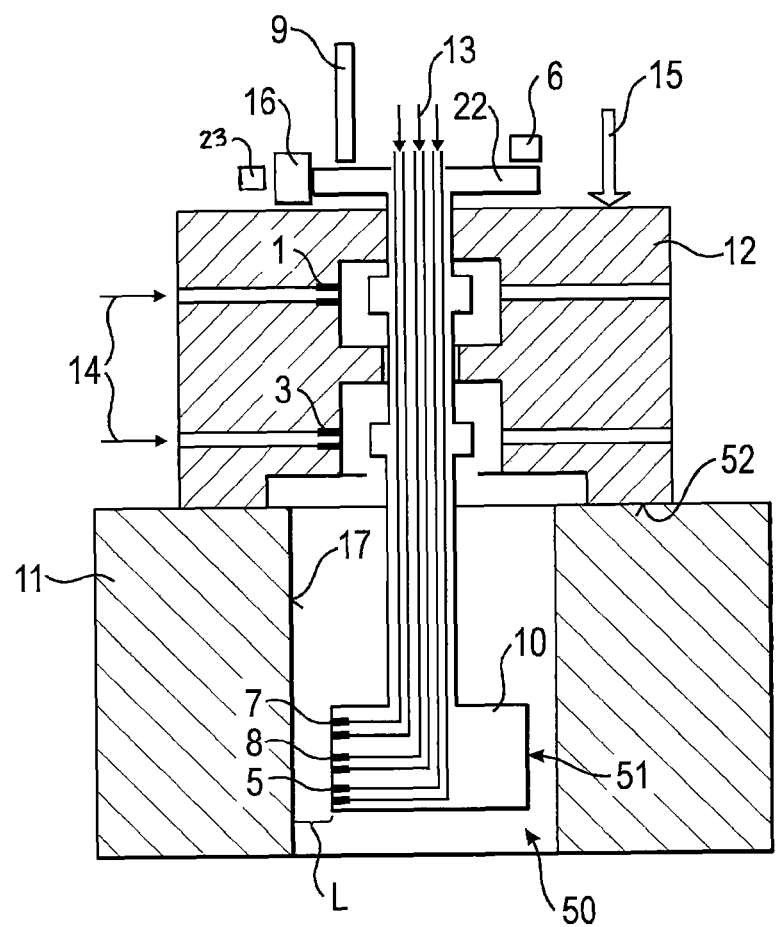
FIG. 6 shows the measurement probe in accordance with FIG. 5 in an associated holder.

As can be seen from FIGS. 5-7, the measurement probe 10 can have sections having different diameters. In the region of the bore 50 to be measured, the diameter of the measurement probe 10 is comparatively large and preferably approximately as large as the diameter of the bore 50 to achieve a high measurement accuracy. In the remaining regions, the diameter of the measurement probe 10 is preferably smaller to keep the weight low. The diameter can be somewhat enlarged again in the region of the distance sensors 1, 2, 3, 4 at the holder side. The outer surfaces of the measurement probe 10 are preferably manufactured particularly precisely in this region to be able to measure the wobble movement as accurately as possible. With very small bores to be measured, the diameter of the measurement probe 10 in the region of the bore to be measured can also be smaller than in the other regions.

In addition to the roundness and to the shape extent of a bore to be measured, the cylinder shape of the bore can also be determined using an apparatus in accordance with the invention. This is possible since the inclination of the measurement probe is measured and an obliqueness or an offset of the cylinder axis of the bore can be determined.

The invention overall allows a robust and fast measurement of the roundness the straightness of the shape extent, the cylinder shape and the diameter of different bores. Cylinder bores can e.g. be measured on shape honing or a reliable inspection of the deformation of sleeves pressed into bores or the like can be carried out. The measurement apparatus in accordance with the invention can be integrated in a simple manner into a production machine and allows a fast, 100% inspection of the produced components. The possibility provided by the invention of carrying out bore inspections on site without having to take the associated workpiece into a laboratory is also an advantage.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An apparatus for the industrial measurement of bores in a measurement object having: a measurement probe which can be introduced into the bore and at which at least one distance sensor is provided with which a distance of a reference point of the measurement probe from a wall of the bore can be determined,
   wherein the measurement probe is rotatably supported at a holder which is fixed with respect to the measurement object and/or whose position relative to the measurement object is known, wherein an evaluation device is designed to receive a number of sequentially determined distances in the course of a rotation of the measurement probe, and
   wherein means are provided for determining the inclination of the measurement probe relative to the holder and correction means are provided for compensating movements and error positions of the measurement probe with reference to the inclination.

2. An apparatus in accordance with claim 1, wherein said measurement object is a workpiece.

3. An apparatus in accordance with claim 1, wherein the evaluation device is designed to determine a maximum inscribed and a minimum circumscribed circle of the measured bore from the sequentially determined distances; and/or wherein the evaluation device is designed to determine the shape extent of the bore at least sectionally from the sequentially determined distances.

4. An apparatus in accordance with claim 1, wherein a drive is provided to rotate the measurement probe with respect to the holder.

5. An apparatus in accordance with claim 1, wherein a rotational position sensor is provided for determining a rotational position of the measurement probe relative to the holder, with the evaluation device being designed to put respective distances determined in the course of a rotation of the measurement probe by the distance sensor into relation with the associated rotational positions determined by the rotational position sensor.

6. An apparatus in accordance with claim 1, wherein means are provided for determining the position of the measurement probe relative to the holder and/or to the measurement object and correction means are provided for compensating movements and error positions of the measurement probe with reference to the position.

7. An apparatus in accordance with claim 6, wherein at least one distance sensor is provided at the holder for determining the position and/or the inclination of the measurement probe, and the distance of a reference point of the holder from the measurement probe can be determined using the at least one distance sensor provided at the holder.

8. An apparatus in accordance with claim 7, wherein at least one pair of distance sensors is provided at the holder for determining the distances of a reference point of the holder from the measurement probe, said at least one pair being arranged in a common plane and being offset to one another by an angle of rotation, with respect to an axis of rotation of the measurement probe, and/or wherein said angle of rotation is set to 90°.

9. An apparatus in accordance with claim 8, wherein at least two pairs of distance sensors spaced apart from one another in the direction of an axis of rotation are provided for determining the distance of a reference point of the holder from the measurement probe.

10. An apparatus in accordance with claim 1, wherein the measurement probe is selected as being either dome-like or cylindrical, with a longitudinal center axis of the measurement probe coinciding with an axis of rotation.

11. An apparatus in accordance with claim 1, wherein a plurality of distance sensors are provided at the measurement probe for determining the distance of a reference point of the holder from the measurement probe which are spaced apart from one another in the direction of an axis of rotation of the measurement probe and are rotationally offset to one another with respect to the axis of rotation.

12. An apparatus in accordance with claim 1, wherein at least one of the distance sensors is based on an inductive or capacitive measurement principle.

13. An apparatus in accordance with claim 1, wherein at least one of the distance sensors is made as a pneumatic measurement nozzle.

14. An apparatus in accordance with claim 1, wherein a contact surface is provided at the holder for pressing the apparatus toward a surface of the measurement object.

15. An apparatus in accordance with claim 1, wherein at least one receiver is provided at the holder for an engagement with a wall section of the measurement object, and/or wherein elastic elements are provided in the receiver for fixing the wall section in the receiver.

16. An apparatus in accordance with claim 1, wherein the measurement probe is adjustable in the direction of an axis of rotation relative to the holder and/or wherein said measurement probe is adjustable by means of a driven linear slide.

17. A method for the industrial measurement of bores in a measurement object, by means of a measurement probe which can be introduced into the bore and at which at least one distance sensor is provided with which a distance of a reference point of the measurement probe from a wall of the bore can be determined,
wherein said method includes the following steps:
introducing the measurement probe into the bore;
rotating the measurement probe in the bore, with the distances being determined repeatedly or continuously during the rotation;
determining the inclination of the measurement probe relative to the holder; and
compensating movements and error positions of the measurement probe (10) with reference to the inclination.

18. A method in accordance with claim 17, wherein the maximum inscribed circle of the bore and the minimum circumscribed circle of the bore are determined from the determined distances, and/or wherein the roundness of the bore is determined from a deviation between the maximum inscribed circle and the minimum circumscribed circle.

19. A method in accordance with claim 17, wherein the shape extent of the bore is determined at least sectionally from the distances determined during the rotation; and/or wherein the measurement probe is rotated by at least one full revolution during a measurement procedure; and/or wherein a position change and/or an inclination change of the measurement probe occurring during the rotation is detected relative to the measurement object and is taken into account in the evaluation.

20. A method in accordance with claim 17, wherein said measurement object is a workpiece.

* * * * *